United States Patent [19]
Mishio et al.

[11] Patent Number: 4,766,969
[45] Date of Patent: Aug. 30, 1988

[54] THREE PART PROPELLER SHAFT ASSEMBLY INCORPORATING FOUR HOOKE JOINTS HAVING OPPOSED PHASES

[75] Inventors: Yasuhiko Mishio; Hidetoshi Shimizu; Takashi Matsuda; Masaru Takeda, all of Toyota, Japan

[73] Assignee: Toyota Jidosha Kabushiki Kaisha, Aichi, Japan

[21] Appl. No.: 5,831

[22] Filed: Jan. 21, 1987

[30] Foreign Application Priority Data

Jan. 30, 1986 [JP] Japan .................. 61-011967

[51] Int. Cl.$^4$ ............................................. B60K 17/22
[52] U.S. Cl. .................................. 180/75.2; 180/70.1; 180/246
[58] Field of Search ............... 180/70.1, 305, 308, 180/75.1, 75.2, 245, 246, 233

[56] References Cited

U.S. PATENT DOCUMENTS

| | | | |
|---|---|---|---|
| 3,089,559 | 5/1963 | Rieck | 180/75.2 |
| 3,758,098 | 9/1973 | Vrilakas | 269/55 |
| 4,317,498 | 3/1982 | Jirousek et al. | 180/70.1 |
| 4,518,370 | 5/1985 | Grain | 180/70.1 |
| 4,577,714 | 3/1986 | Tokunaga | 180/70.1 |

FOREIGN PATENT DOCUMENTS

| | | |
|---|---|---|
| 59-38133 | 3/1984 | Japan . |
| 60-234024 | 11/1985 | Japan . |
| 0626487 | 7/1949 | United Kingdom . |

Primary Examiner—Richard A. Bertsch
Attorney, Agent, or Firm—Parkhurst & Oliff

[57] ABSTRACT

A vehicle has an engine and a driven differential. This three part type propeller shaft assembly includes a first propeller shaft element, a second propeller shaft element, and a third propeller shaft element. A first joint incorporating a Hooke joint rotationally couples the engine to a one end of the first propeller shaft element. A second joint incorporating a Hooke joint rotationally couples the other end of the first propeller shaft element to a one end of the second propeller shaft element. A third joint incorporating a Hooke joint rotationally couples the other end of the second propeller shaft element to a one end of the third propeller shaft element. And a fourth joint incorporating a Hooke joint rotationally couples the other end of the third propeller shaft element to the driven differential. Two bearing supports, one disposed near each end of the second propeller shaft element, elastically and rotatably support it from the vehicle body. The phases of the first joint and the fourth joint are set to be the same as one another, while the phases of the second and the third joints are set to be the same as one another and to be opposite to the common phase of the first joint and the fourth joint.

1 Claim, 5 Drawing Sheets

THREE PART PROPELLER SHAFT ASSEMBLY INCORPORATING FOUR HOOKE JOINTS HAVING OPPOSED PHASES

BACKGROUND OF THE INVENTION

The present invention relates to a three part type propeller shaft for a vehicle such as an automobile, and more particularly relates to such a three part type propeller shaft which incorporates four Hooke type universal joints, and which is notable for smoothness and lack of wobbling and vibration.

The present invention has been described in Japanese Utility Model Application Ser. No. Showa 61-011967 (1986), filed by an applicant the same as the applicant or the entity assigned or owed duty of assignment of the present patent application; and the present patent application hereby incorporates into itself by reference the text of said Japanese Patent Application and the claim and the drawings thereof; a copy is appended to the present application.

Further, the present inventors wish hereby to attract the attention of the examining authorities to copending Patent Applications Ser. Nos. 889,612, now U.S. Pat. No. 4,724,708, and 899,937, which may be considered to be material to the examination of the present patent application.

As a propeller shaft assembly for a vehicle such as an automobile, it has long been conventional to employ a single part propeller shaft coupled at its front end by a first Hooke joint to the power output shaft of the transmission and at its rear end by a second Hooke joint to the power input shaft of the differential device of the vehicle. Further, it is known to utilize a two part propeller shaft assembly made up from two propeller shaft elements coupled together by a second Hooke joint, and as before coupled at its front end by a first Hooke joint to the power output shaft of the transmission and at its rear end by a third Hooke joint to the power input shaft of the differential device of the vehicle; this type of two part propeller shaft assembly was introduced in order to reduce the vibration and consequent noise level during high speed operation.

There are also known in the art various types of automotive vehicle equipped with cross mounted engines, disposed in such a manner than the engine crank shaft extends transversely to the body of the vehicle, and such vehicles are normally of the front wheel drive type. However, recently there have been developed so called full time four wheel drive type vehicles, which are provided with a central differential apparatus for distributing power between the front wheels and the rear wheels of the vehicle. Such a central differential apparatus is typically provided with a selectably actuatable locking mechanism for selectably preventing it from providing differential action, at the will of the vehicle driver. Further, there are also known four wheel drive vehicles which can be selectably switched to two wheel drive operational mode or four wheel drive operational mode, i.e. so called part time four wheel drive vehicles. Both these types of vehicle may typically include a transversely mounted engine whose crank shaft and rotational power axis extends transversely to the longitudinal axis of the body of the vehicle. In four wheel drive type vehicles with such a transversely mounted engine arrangement, the distance between the output side of the engine and transmission unit and the front end of the differential device for the rear wheels becomes even greater than heretofore, and accordingly the propeller shaft assembly inevitably becomes longer. Accordingly, various types of three part propeller shaft assembly have begun to be utilized in such four wheel drive transverse engine type vehicle configurations. Such three part propeller shaft assemblies include three propeller shaft elements and four universal joints.

In more detail, such a three part propeller shaft assembly typically includes a first or front propeller shaft element rotationally coupled at its front end by a first universal joint to the rear end of the power output shaft of the engine, a second or center propeller shaft element rotationally coupled at its front end by a second universal joint to the rear end of said first propeller shaft element, and a third propeller shaft element rotationally coupled at its front end by a third universal joint to the rear end of said second propeller shaft element and rotationally coupled at its rear end by a fourth universal joint to the front end of the input shaft of the differential for the rear wheels of the vehicle. And the center propeller shaft element is typically rotatably and elastically mounted to the lower side of the floor of the vehicle body by two elastic center shaft bearing supports, one near each of its ends; this is done in order positively to support said center propeller shaft element and to limit the number of degrees of freedom of the propeller shaft assembly as a whole. With this kind of three part propeller shaft assembly, especially in the case in which it is fitted to a four wheel drive type automotive vehicle, in order to maximize the space within the passenger compartment of the vehicle and so as to minimize the irregularity in the floor of the vehicle caused by the provision of the propeller shaft assembly passing thereunder from the front of the vehicle to the rear, it is known and is in fact almost mandatory (due to the difference in the height of the transmissin or transaxle assembly and the rear wheel differential device, and due to the difference in the height of the vehicle body and the support portions for the center propeller shaft element which results from the need to maximize the space within the passenger compartment) for the three propeller shaft elements and the four joints to be extended, not in a straight line, but with each joint bent through its own characteristic angle, and typically with the center propeller shaft element held lower than the other two propeller shaft elements. Further, for reasons of cost and simplicity of construction, it is desirable to employ Hooke joints for as many as possible of these universal joints. Also, in order to absorb the rotational fluctuations created at the Hooke joints, it is typical to dispose adjacent Hooke joints in such a mannner as to have mutually opposite phases; an exemplary such prior art transmission system is shown in schematic skeleton form in FIG. 6 of the accompanying drawings and will be described hereinafter.

Further, two part propeller shaft assemblies which utilize three joints have been proposed which employ a Hooke joint for the first joint and which employ constant velocity type joints for the second and third joints; certain such propeller shaft assemblies are disclosed, for example, in Japanese Patent Laying Open Publication Ser. No. 59-38133 (1984), which it is not intended hereby to admit as prior art to the present patent application except to the extent in any case required by applicable law.

A problem that has occurred with such a system is as follows. In the above outlined construction, generally during the high speed operational condition the vibration level and the noise level are low, but upon occasion a new type of vibration noise phenomenon not seen in the case of vehicles provided with single part propeller shaft assemblies or vehicles provided with two part propeller shaft assemblies arises. This vibrational noise is considered to be caused by rotational fluctuations originating in the propeller shaft elements.

As is per se known, when a Hooke joint is bent through an angle and is transmitting load from one propeller shaft element to another, a secondary force coupled is created. Thus, wobbling and vibration are caused in the propeller shaft elements due to secondary force couples arising in the joint angles present between the three propeller shaft elements. In particular, when a full time four wheel drive vehicle including such a three part type propeller shaft assembly is operated with the central differential apparatus in the locked condition, or when a part time four wheel drive vehicle likewise incorporating such an assembly is operated in the four wheel drive condition, especially in the event that the engine is cross mounted and the engine, the transmission, the differential for the front wheels, and the front wheel drive shafts are integrally constructed and their various rotational axes are disposed substantially in parallel, then the engine and the rear wheel differential device will both tend to rotate somewhat upwards due to torque set up due to the rotational difference between the front wheels and the rear wheels of the vehicle; however, in the case of a straight mounted engine type vehicle, then the engine and the rotational axis of the front wheels are not parallel, and accordingly the rear wheel differential device will tend to rotate somewhat upward but the engine will not tend to rotate significantly upward. The angles of the various joints of the three part type propeller shaft assembly are thereby increased, and this causes increase in the secondary force couples described above, which causes the above explained problems of wobbling vibration and noise due to secondary force couples to be accentuated.

One possible countermeasure for coping with this problem of wobbling vibration and noise due to secondary force couples would be either to change the initial joint angles, i.e. to anticipate the upward rotation of the engine and of the rear differential device as described above and to determine the initial joint angles in the light thereof, or to set the spring constants of the two elastic center shaft bearing supports for the center propeller shaft element to be greater, i.e. to make said center shaft bearing supports stiffer by, for example, using a stiffer rubber element in their constructions. However, changing the initial joint angles in this way would lead to the problems of reduced space in the vehicle passenger compartment and of degradation of the noise characteristics in said passenger compartment; and, although the concept of increasing of the spring constants of the two elastic center shaft bearing supports is effective for preventing or reducing such wobbling vibration and consequent noise, the general noise level as well as the booming noise level within the passenger compartment are thereby undesirably increased, and also the durability of the center shaft bearing supports would be deteriorated, and accordingly these problems in practice make such solutions not practicable. As a result, substantial reduction by these methods of the wobbling vibration and consequent noise is not possible, in the light of the problems of passenger compartment noise and of center shaft bearing support durability.

The adoption of two part propeller shaft assemblies utilizing a Hooke joint for the first joint and utilizing constant velocity type joints for the second and third joints might also be conceived of, but this would invite a sharp cost increase, and accordingly is not acceptable from the point of view of economy of vehicle manufacture.

SUMMARY OF THE INVENTION

Accordingly, it is the primary object of the present invention to provide a three part propeller shaft assembly, which can reduce wobbling vibration and noise due to secondary force couples.

It is a further object of the present invention to provide such a three part propeller shaft assembly, which does not cause an undesirable increase of noise such as booming noise within the passenger compartment.

It is a further object of the present invention to provide such a three part propeller shaft assembly, which is particularly suitable for use with a four wheel drive type of vehicle.

It is a further object of the present invention to provide such a three part propeller shaft assembly, which is particularly suitable for use with a full time four wheel drive type of vehicle, especially when a central differential device thereof is set to the locked condition.

It is a further object of the present invention to provide such a three part propeller shaft assembly, which has good durability.

It is a further object of the present invention to provide such a three part propeller shaft assembly, which is economical to manufacture and keeps costs down.

It is a yet futher object of the present invention to provide such a three part propeller shaft assembly, which keeps vehicle drivability high.

According to the most general aspect of the present invention, referring particularly to the skeleton view shown in FIG. 1, these and other objects are attained by, for a vehicle comprising a means for providing rotational power (the engine as denoted by the reference symbol 10), a means for receiving rotational power and transmitting it to a road surface (the rear differential device 60), and a body (B): a three part type propeller shaft assembly (50), comprising: a first propeller shaft element (52), a second propeller shaft element (54), and a third propeller shaft element (56); a first joint (51) comprising a Hooke joint which rotationally couples said means for providing rotational power (10) to a one end of said first propeller shaft element (52); a second joint (53) comprising a Hooke joint which rotationally couples the other end of said first propeller shaft element (52) to a one end of said second propeller shaft element (54); a third joint (55) comprising a Hooke joint which rotationally couples the other end of said second propeller shaft element (54) to a one end of said third propeller shaft element (56); a fourth joint (57) comprising a Hooke joint which rotationally couples the other end of said third propeller shaft element (56) to said means (60) for receiving rotational power and transmitting it to a road surface; and: two means (58 and 59) for elastically rotatably supporting said second propeller shaft (54) from said body (B), one disposed near each end of said second propeller shaft element (54); the phases of said first joint (51) and said fourth joint (57) being set to be the same as one another, while the phases of said second and said third joints (53 and 55) are set to be the same as one another and to be opposite to said common phase of said first joint (51) and said fourth joint (57).

According to such a structure, the secondary couples of forces which tend to wobble the center propeller shaft element 54 are created vertically in the yoke surfaces of each of the first through the fourth joints 51, 53, 55, and 57. Since the second joint 53 and the third joint 55 on the opposite ends of the center propeller shaft element 54 are set to have the phase as one another, the forces acting as a result thereof on said center propeller shaft element 54 are offset by 90°, and accordingly these forces are dispersed, and thus the wobbling vibration and noise due to secondary force couples on the center propeller shaft element 54 is minimized. On the other hand, the principal forces which tend to wobble the front center shaft bearing support 58 are a secondary couple on the output side of the first joint 51 and a secondary couple on the input side of the second joint 53, and the joint angles theta1 and theta2 at these joints are opposing (although not being necessarily quite equal in sign) as shown in the skeleton view of FIG. 2, and, since the phases of the first joint 51 and the second joint 53 at the two ends of the first propeller shaft element 52 are set to be opposite, the directions of the secondary couples of forces at the two ends of the first propeller shaft element 52 oppose one another and tend to cancel one another out. Thus the wobbling vibration and noise due to secondary force couples on the first propeller shaft element, also, is minimized. Further, the principal forces which tend to wobble the rear center shaft bearing support 59 are a secondary couple on the output side of the third joint 55 and a secondary couple on the input side of the fourth joint 59, and the joint angles theta3 and theta4 at these joints are opposing (although again not being necessarily quite equal in sign) as shown in the skeleton view of FIG. 2, and, since the phases of the third joint 55 and the fourth joint 57 at the two ends of the third propeller shaft element 56 are also set to be opposite, in a similar manner to that described above the directions of the secondary couples of forces at the two ends of the third propeller shaft element 56 oppose one another and tend to cancel one another out. Further, since the numbers of joints with the one phase and with the opposite phase are equal (there are in fact two of each), the rotational wobblings set up in the first through the fourth joints 51, 53, 55, and 57 produce almost no disadvantageous effects. Thereby, wobbling of the second propeller shaft element 54 is minimized, and it also becomes possible to set the spring constants of the two elastic center shaft bearing supports for the center propeller shaft element to be relatively low, which enables the reduction of noise such as booming noise in the passenger compartment and further increases the durability of said two elastic center shaft bearing supports for the center propeller shaft element.

BRIEF DESCRIPTION OF THE DRAWINGS

The present invention will now be described with respect to the preferred embodiments thereof, and with reference to the illustrative drawings appended hereto, which however are provided for the purposes of explanation and exemplification ony, and are not intended to be limitative of the scope of the present invention in any way, since this scope is to be delimited solely by the accompanying claim. With relation to the figures, spatial term are to be understood as referring only to the orientation on the drawing paper of the illustrations of the relevant parts, unless otherwise specified; like reference numerals, unless otherwise so specified, denote the same parts and gaps and spaces and so on in the various figures; and:

DESCRIPTION OF THE PREFERRED EMBODIMENT

Figure 4:
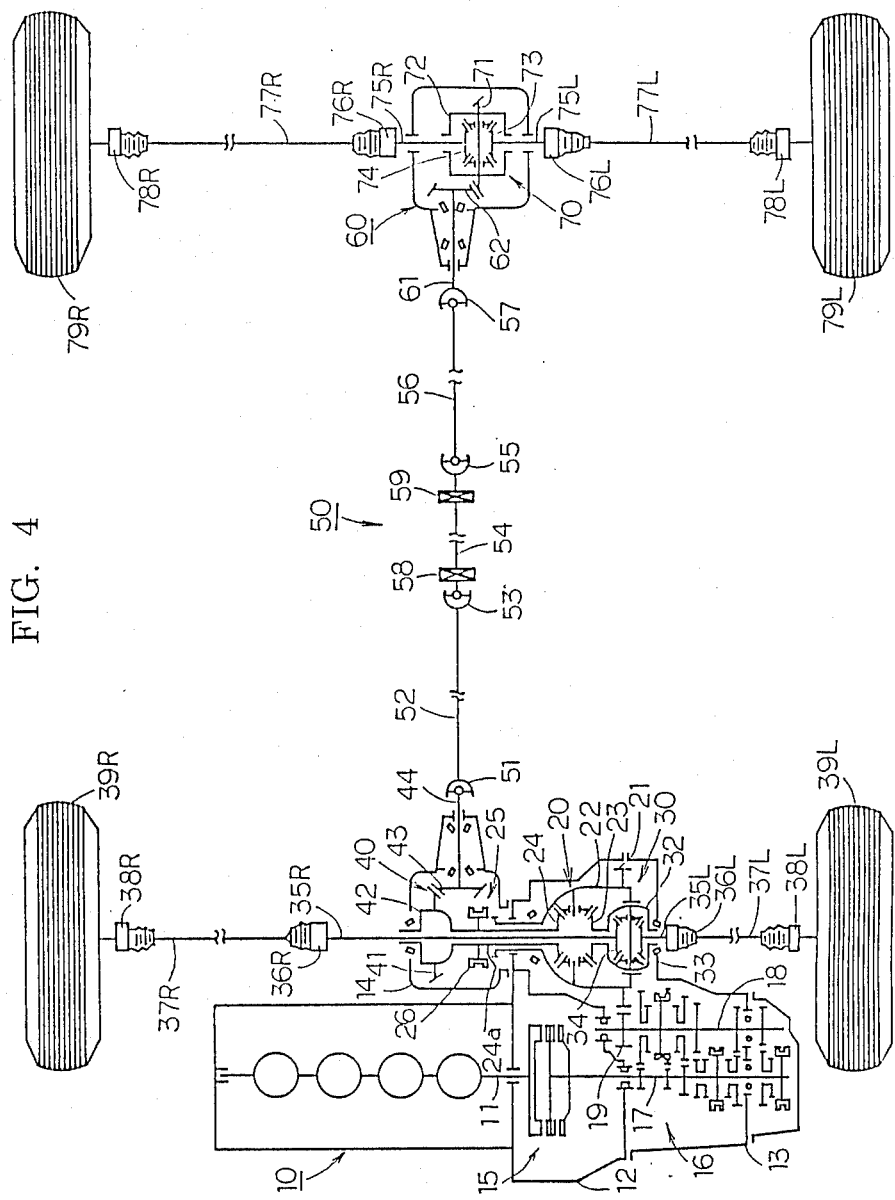
FIG. 4 is a schematic skeleton plan view showing the FIG. 1 power train of the automotive vehicle incorporating said preferred embodiment of the three part propeller shaft assembly according to the present invention, and particularly showing constructional details of other power transmission devices incorporated in said power train.

The present invention will now be described with reference to the preferred embodiments thereof, and in conjunction with the appended drawings. FIG. 4 shows in schematic skeleton plan view a power train of a four wheel drive type automotive vehicle incorporating the preferred embodiment of the three part propeller shaft assembly of the present invention; this automotive vehicle in fact is of the so called full time 4WD type, and has an engine transversely mounted in its engine room. In this figure, the reference numeral 10 denotes said transversely mounted engine, while 15 denotes a clutch device driven from said engine 10, 16 denotes a transmission mechanism including a gear transmission mechanism which can be set to any one of a plurality of speed stages, 20 denotes a central differential device, 30 denotes a front wheel differential device, 40 denotes a rear wheel drive direction altering mechanism, 50 denotes the aforementioned preferred embodiment of the three part propeller shaft assembly of the present invention, and 70 denotes a rear wheel differential device, which is mounted inside a casing 60.

In more detail, the engine 10 is as abovementioned transversely mounted in the engine room, not particularly shown, of the vehicle, with the crank shaft 11 of said engine 10 extending transversely to the longitudinal axis of the vehicle. To one end of the engine block of the engine 10 there is fixed a transaxle and clutch casing 12, and to the end of said transaxle casing 12 opposite from the engine 10 there is mounted a transmission housing 13. And on the engine 10 side of the transaxle and clutch casing 12, but somewhat rearwards displaced from said engine 10, there is fixed a transfer casing 14.

The crank shaft 11 is drivingly coupled to a rotational power input member of the coaxially disposed clutch device 15, and a rotational power output member of said clutch device 15 is drivingly coupled to a rotational power input member or input shaft 17 of the similarly coaxially disposed transmission device 16. A rotational power output member or output shaft 18 of said transmission device 16 is rotatably mounted in the transmission housing 13 and is disposed in parallel with said input shaft 17, and further has a power output gear wheel 19 fixedly mounted on it. The clutch device 15 and the transmission device 16 are of per se conventional types and function in per se conventional ways; accordingly, the details of their structure and functioning will not be further discussed in this specification.

In the transaxle casing 12 there are further fitted the central differential device 20 and the front wheel differential device 30. The central differential device 20 is of a per se known bevel gear type, and divides the rotational power inputted to it from the engine 10 via the clutch device 15 and the transmission device 16 between a front wheel transmission assembly and a rear wheel transmission assembly. In detail, this central differential device 20 comprises a differential case 22 and a final reduction gear or ring gear 21, supported on said differential case 22, which is constantly meshingly engaged with the power output gear wheel 19 of the transmission device 16. Two differential pinion gears, not particularly denoted by any reference numerals, are rotatably mounted to said differential case 22 about an axis transverse to the axis of the final reduction ring gear 21, and with these differential pinion gears there are meshed a left side driven gear wheel 23 and a right side driven gear wheel 24; thus, differential action is available for distributing rotational power between said left and right side driven gear wheels 23 and 24. The left side driven gear wheel 23 is integrally formed on the end of a shaft the other end of which is integrally formed with a differential casing 32 of the front wheel differential device 30, while the right side driven gear wheel 24 is integrally formed on the end of a hollow shaft member 24a which extends out from the transaxle casing 12 to the interior of the transfer casing 14.

The front wheel differential device 30 is provided on one side (the left side with relation to the longitudinal axis of the vehicle) of the central differential device 20, and is coaxial therewith. The differential casing 32 of said front wheel differential device 30 is, as implied above, directly rotationally driven from the left side driven gear wheel 23 of said central differential device 20, and carries two differential pinion gears, not particularly denoted by any reference numerals, which are rotatably mounted to said differential casing 32 about an axis transverse to the main longitudinal axis of said front wheel differential device 30. With these differential pinion gears there are meshed a left side driven gear wheel 33 and a right side driven gear wheel 34; thus, differential action is available for distributing rotational power between said left and right side driven gear wheels 33 and 34. The left side driven gear wheel 33 is rotationally coupled, via a relatively short left side front vehicle axle 35L, a left side slide type constant velocity joint 36L, a left side drive shaft 37L, and a left side fixed type constant velocity joint 38L, to the left front wheel 39L of the vehicle. Similarly, the right side driven gear wheel 34 is rotationally coupled, via a relatively long right front vehicle axle 35R which extends completely through the central differential device 20 and also completely through the rear wheel drive direction altering mechanism 40, and via a right side slide type constant velocity joint 36R, a right side drive shaft 37R, and a right side fixed type constant velocity joint 38R, to the right front wheel 39R of the vehicle. Thereby, rotational power from the engine 10 of the vehicle is transmitted, after being provided with differential action with respect to division between the front and the rear wheels of the vehicle by the central differential device 20, and with differential action subsequently being provided between said left and right front wheels 39L and 39R by this front wheel differential device 30, to said left and right front wheels 39L and 39R.

Inside the transfer casing 14 there is provided the rear wheel drive direction converting gear mechanism 40, and there is also provided a selectively actuatable locking mechanism 25 incorporating a locking sleeve spline 26 fitted over the hollow shaft member 24a extending out from the transaxle casing 12, which can either lock the right side driven gear wheel 24, which is integrally formed together with said hollow shaft member 24a, to the differential case 22 of the central differential device 20 (which has an appropriately splined extension portion reaching into the transfer casing 14), or can allow these members to be rotationally free with respect to one another. And the rear wheel drive direction converting gear mechanism 40 comprises a mounting case 42 on the periphery of which there is provided a ring gear 41, said mounting case 42 being rotationally drivingly coupled to the end of the hollow shaft member 24a and being driven thereby. With the ring gear 41 there is constantly meshed a driven pinion gear 43 fixedly mounted on the forward end of a driven pinion gear shaft 44, and thereby the directional axis of the driving rotational force for being supplied to the rear wheels of the vehicle is converted from being substantially transverse to the vehicle body to being substantially longitudinal to said vehicle body.

This driving rotational force for being supplied to the rear wheels of the vehicle is then transmitted from the rear end of this driven pinion gear shaft 44, via the preferred embodiment of the three part propeller shaft assembly of the present invention herein denoted as 50 which will be described in detail shortly, to the forward end of a drive pinion gear shaft 61 of the rear wheel differential device 70, on the rear end of which there is fixedly mounted a drive pinion gear 62 which is constantly meshed with a ring gear 71 which is provided on the periphery of a differential case 72 of said rear wheel differential device 70, which is accordingly rotationally driven by said ring gear 71. This differential case 72 carries two differential pinion gears, not particularly denoted by any reference numerals, which are rotatably mounted to the differential casing 72 about an axis transverse to the main longitudinal axis of said rear wheel differential device 70. With these differential pinion gears there are meshed a left side driven gear wheel 73 and a right side driven gear wheel 74; thus, differential action is available for distributing rotational power between said left and right side driven gear wheels 73 and 74. The left side driven gear wheel 73 is rotationally coupled, via a left side rear vehicle axle 75L, a left side slide type constant velocity joint 76L, a left side drive shaft 77L, and a left side fixed type constant velocity joint 78L, to the left rear wheel 79L of the vehicle. Similarly, the right side driven gear wheel 74 is rotationally coupled, via a right side rear vehicle axle 75R, a right side slide type constant velocity joint 76R, a right side drive shaft 77R, and a right side fixed type constant velocity joint 78R, to the right rear wheel 79R of the vehicle. Thereby, rotational power transmitted through the propeller shaft assembly 50 from the engine 10 of the vehicle is transmitted, after being provided with differential action with respect to division between the front and the rear wheels of the vehicle by the central differential device 20, with differential action subsequently being provided between said rear wheels 79L and 79R by this rear wheel differential device 70, to said left and right rear wheels 79L and 79R.

Now, the preferred embodiment of the three part propeller shaft assembly of the present invention, herein denoted as 50, will be described, with particular reference to FIGS. 1 and 2 which are skeletal views thereof in two different operational conditions, and with reference to FIG. 3 which shows said preferred embodiment from the side. This propeller shaft assembly 50 drivingly couples the rear end of the driven pinion gear shaft 44 to the front end of the drive pinion gear shaft 61, and comprises, in order from the front to the rear of the vehicle: a first joint 51 which is a Hooke joint, a front propeller shaft element 52, a second joint 53 which is also a Hooke joint, a center propeller shaft element 54, a third joint 55 which also is a Hooke joint, a rear propeller shaft element 56, and a fourth joint 57 which is also a Hooke joint. The three part propeller shaft assembly 50 of the present invention also comprises supports 58 and 59 which are provided near the front and rear ends of the center propeller shaft element 54 and elastically support said center propeller shaft element 54 from the floor of the vehicle body (denoted as "B" in the drawings) with a certain degree of resilience, while allowing said center propeller shaft element 54 to be free to rotate about its central axis. The first Hooke joint 51 rotationally couples the front end of the front propeller shaft element 52 to the rear end of the driven pinion gear shaft 44, while allowing a certain angular inclination theta1 to be present between their central longitudinal axes. The second Hooke joint 53 rotationally couples the front end of the central propeller shaft element 54 to the rear end of the front propeller shaft element 52, while allowing a certain angular inclination theta2 to be present between their central longitudinal axes. The third Hooke joint 55 rotationally couples the front end of the rear propeller shaft element 56 to the rear end of the central propeller shaft element 54, while allowing a certain angular inclination theta3 to be present between their central longitudianl axes. And the fourth Hooke joint 57 rotationally couples the front end of the drive pinion gear shaft 61 to the rear end of the rear propeller shaft element 56, while allowing a certain angular inclination theta4 to be present between their central longitudinal axes. And the supports 58 and 59 serve for supporting the central propeller shaft element 54 and for stopping the whole construction from flopping about and thrashing around, i.e. from having too many degrees of freedom; albeit with a certain amount of resilience as will be explained later.

Now, as mentioned above, Hooke joints are utilized for the first, the second, the third, and the fourth joints 51, 53, 55, and 57. Particularly according to the present inventive concept, the first Hooke joint 51 and the fourth Hooke joint 57 are set to have equivalent (i.e. identical) phases, while on the other hand the second Hooke joint 53 is set to have a phase opposite to the phase of the third Hooke joint 55. Thus, the phases of the first Hooke joint 51, the second Hooke joint 53, the third Hooke joint 55, and the fourth Hooke joint 57 are respectively set to 0°, 90°, 90°, and 0°.

Referring again to FIGS. 1 and 2, the engine 10 and the transaxle and clutch casing 12 are elastically mounted to the body B of the vehicle by engine mounts denoted as EM, and the rear differential device casing 60 is elastically mounted to said body B of the vehicle by differential mounts denoted as DM. Further, the front end of the center propeller shaft element 54 is rotatably mounted in a front propeller shaft support 58 which is elastically supported from said body B of the vehicle, while similarly the rear end of said center propeller shaft element 54 is rotatably mounted in a rear propeller shaft support 59 which is elastically supported from said body B of the vehicle. Herein, the angle between the front end of the front propeller shaft element 52 and the rear end of the driven pinion gear shaft 44, i.e. the bending angle of the first Hooke joint 51, will be denoted as theta1; the angle between the front end of the central propeller shaft element 54 and the rear end of the front propeller shaft element 52, i.e. the bending angle of the second Hooke joint 53, will be denoted as theta2; the angle between the front end of the rear propeller shaft element 56 and the rear end of the central propeller shaft element 54, i.e. the bending angle of the third Hooke joint 55, will be denoted as theta3; and the angle between the front end of the drive pinion gear shaft 61 and the rear end of the rear propeller shaft element 56, i.e. the bending angle of the fourth Hooke joint 57, will be denoted as theta4; these angles are all positive with the sense indicated in FIG. 1, in order for the propeller shaft assembly according to the present invention to drop downwards as it passes under the floor of the passenger compartment of the vehicle, thus allowing said passenger compartment to be as capacious as possible and minimizing the irregularity of the floor thereof.

Now, an explanation of the operation of this preferred embodiment of the three part propeller shaft assembly according to the present invention will be provided.

Figure 1:
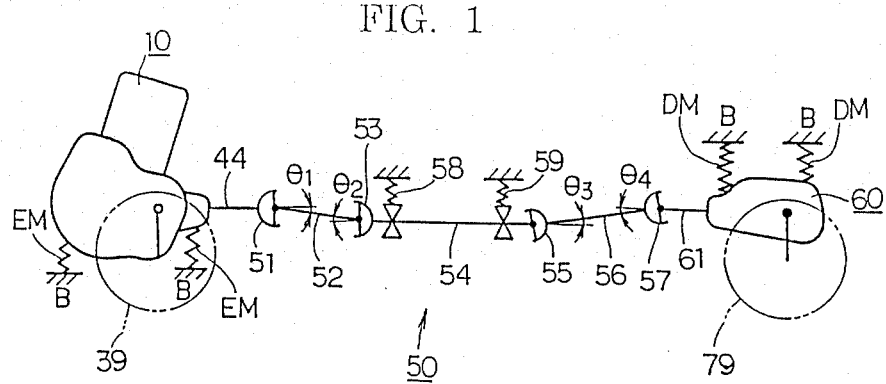
FIG. 1 is a schematic skeleton side view showing the preferred embodiment of the three part propeller shaft assembly of the present invention as fitted to the power train of an automotive vehicle.
Figure 2:
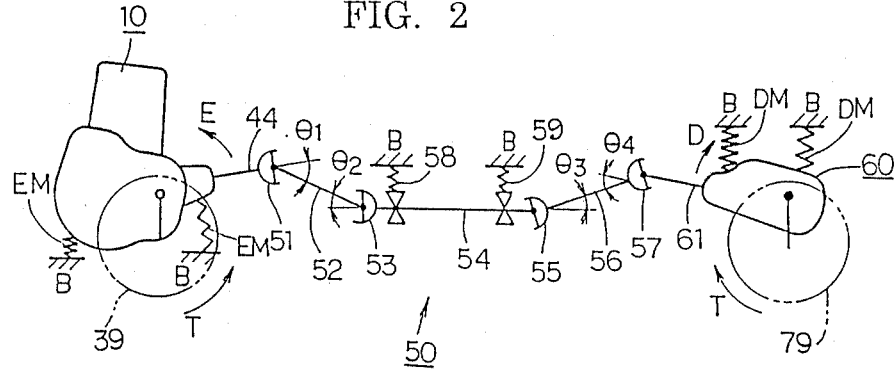
FIG. 2 is a schematic skeleton side view similar to FIG. 1, showing said preferred embodiment of the three part propeller shaft assembly of the present invention in its stressed operational condition, with a central differential apparatus of a full time 4WD type transmission mechanism, with which the power train of the automotive vehicle is equipped and which drives said propeller shaft assembly, being set to the locked condition.
Figure 3:
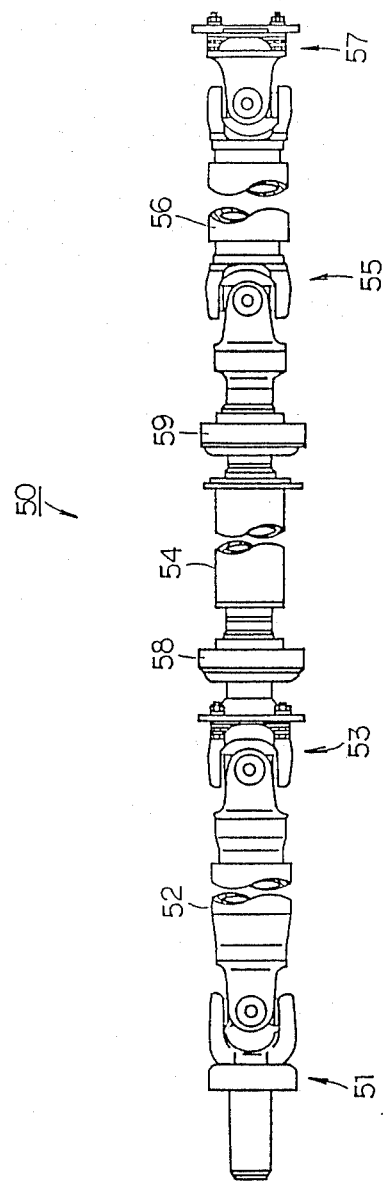
FIG. 3 is an external side view of said preferred embodiment of the three part propeller shaft assembly of the present invention, as seen in isolation.

When the vehicle is being operated to be driven along the road with the central differential device 20 in the locked operational condition so that said central differential device 20 cannot perform differential action, then, because of the constraint that no difference can occur in rotational speed between the front and the rear wheels of the vehicle, and because of the relatively strong friction of the tires upon the road surface, a relatively large torque denoted as T is set up as acting upon the front wheels 39 and the engine 10 and the rear wheels 79 and upon the rear differential device 60, as shown in FIG. 2, and relatively large torques are set up upon the driven pinion gear shaft 44, which acts as the output shaft of the transaxle unit, on the front, center, and rear propeller shaft elements 52, 54, and 56, and upon the drive pinion gear shaft 61 which acts as a rotational power input shaft for the differential device 60. These torques cause the engine 10 with the transaxle casing as a whole to rotate counterclockwise as shown by the arrow E in FIG. 2, and also causes the differential device 60 as a whole to rotate clockwise as shown by the arrow D also in that figure. In other words, the rear end of the driven pinion gear shaft 44 and the front end of the drive pinion gear shaft 61 are both raised, as can be seen by contrasting FIG. 2 with FIG. 1. As a result, the joint angles theta1 through theta4 of the first through the fourth joints 51, 53, 55, and 57 of the propeller shaft assembly are all increased (taken in the sense of the figures) and accordingly the secondary coupling forces on the front, center, and rear propeller shaft elements 52, 54, and 56 at these joints due to the torque are increased, and fluctuate according to the rotation of the propeller shaft assembly 50.

Next, the secondary coupling forces which tend to displace the center shaft front bearing support 58 and the center shaft rear bearing support 59 will be considered.

When these secondary coupling forces increase, the engine 10 and the transaxle and final reduction gear 60 are left largely uninfluenced, due to the equilibrium of the energy of the secondary force couples, and hence a relatively large force is exerted on the center shaft from bearing support 58 and the center shaft rear bearing support 59 which elastically rotationally support the center propeller shaft portion 54 from the vehicle body, and said center propeller shaft portion 54 wobbles with a wobble amplitude determined by the spring constant of said supports 58 and 59.

The secondary force couples, which comprise the energy which causes the wobbling of the center propeller shaft portion 54, are set up vertically in the yoke surfaces of the first through the fourth Hooke joints 51, 53, 55, and 57. As a result, when the phases of the second and the third Hooke joints 53 and 55 at the two ends of the center propeller shaft portion 54 are set as opposite (that is, the yokes at either end of said center propeller shaft portion 54 are oriented in the same direction), the two secondary force couples acting on the two ends of said center propeller shaft portion 54 are set up in the same plane, and the energy for causing the wobbling of the center propeller shaft portion 54 becomes greater. Hence the amplitude of said wobbling of said center propeller shaft portion 54 is increased. However, if on the other hand the phases of the second and the third Hooke joints 53 and 55 at the two ends of the center propeller shaft portion 54 are set as the same (that is, the yokes at either end of said center propeller shaft portion 54 are oriented in directions set at 90° to one another), the two secondary force couples acting on the two ends of said center propeller shaft portion 54 are set up in planes likewise at 90° to one another, and the energy for causing the wobbling of the center propeller shaft portion 54 becomes dispersed and tends somewhat to cancel itself out. Hence the amplitude of said wobbling of said center propeller shaft portion 54 is decreased. Accordingly the present inventors have conceived that it should be effective, in order to minimize the wobbling effect of said center propeller shaft portion 54, to set the phases of the second and the third Hooke joints 53 and 55 at the two ends of the center propeller shaft portion 54 to be the same as one another, in order as described above to cause the phases of the secondary coupling forces created on said center propeller shaft portion 54 to be offset by 90°.

Now, the relationship between the phases of the first Hooke joint 51 and the second Hooke joint 53, and the relationship between the phases of the third Hooke joint 55 and the fourth Hooke joint 57, will be considered.

The first Hooke joint 51 and the second Hooke joint 53 at the two ends of the front propeller shaft portion 52 have opposite joint angles denoted in FIGS. 1 and 2 as theta1 and theta2 respectively, with the opposite senses as shown in those figures. Hence, the secondary force couples set up at these first and second Hooke joints 51 and 53 are opposite. As a result, when the phases of the first Hooke joint 51 and the second Hooke joint 53 at the opposite ends of the front propeller shaft portion 52 are set as opposite (that is, the yokes at either end of said front propeller shaft portion 52 are oriented in the same direction), the two secondary force couples acting on the two ends of said front propeller shaft portion 52 are set up in planes at 90° to one another, and the energy for causing the wobbling of said front propeller shaft portion 52 becomes dispersed and tends somewhat to cancel itself out. Hence the amplitude of said wobbling of said front propeller shaft portion 52 is decreased. Accordingly the present inventors have conceived that it should be effective, in order to minimize the wobbling effect of said front propeller shaft portion 52, to set the phases of the first and the second Hooke joints 51 and 53 at the two ends of the front propeller shaft portion 52 to be opposite to one another, in order as described above to cause the phases of the secondary coupling forces created on said front propeller shaft portion 52 to be offset by 90°.

Similarly, the third Hooke joint 55 and the fourth Hooke joint 57 at the two ends of the rear propeller shaft portion 56 have opposite joint angles denoted in FIGS. 1 and 2 as theta3 and theta4 respectively, with the opposite senses as shown in those figures. Hence, the secondary force couples set up at these third and fourth Hooke joints 55 and 57 are opposite. As a result, when the phases of the third Hooke joint 55 and the fourth Hooke joint 57 at the opposite ends of the rear propeller shaft portion 56 are set as opposite (that is, the yokes at either end of said rear propeller shaft portion 56 are oriented in the same direction), the two secondary force couples acting on the two ends of said rear propeller shaft portion 56 are set up in planes at 90° to one another, and the energy for causing the wobbling of said rear propeller shaft portion 56 becomes dispersed and tends somewhat to cancel itself out. Hence the amplitude of said wobbling of said rear propeller shaft portion 56 is decreased. Accordingly the present inventors have conceived that it should be effective, in order to minimize the wobbling effect of said rear propeller shaft portion 56, to set the phases of the third and the fourth Hooke joints 55 and 57 at the two ends of the rear propeller shaft portion 56 to be opposite to one another, in order as described above to cause the phases of the secondary coupling forces created on said rear propeller shaft portion 56 to be offset by 90°.

Thus, in summary, in the present case when Hooke joints are utilized for the four propeller shaft joints, it is considered that a great reduction in the wobbling force couples imposed upon the center shaft front and rear bearing supports may be realized by arranging the phases of the first through the fourth Hooke joints 51 through 57 to be, in series, 0°, 90°, 90°, and 0°, i.e. by arranging the phases of said first Hooke joint 51 and said fourth Hooke joint 57 as being set to be the same as one another, while arranging the phases of said second and said third Hooke joints 53 and 55 to be set to be the same as one another and to be opposite to said common phase of said first Hooke joint 51 and said fourth Hooke joint 57.

In such a case, furthermore, because the numbers of joints with the one phase and the opposite phase are equal (both being two in number), a further advantage with regard to low induced wobbling amount is obtained.

It should be noted that the variation in the angular velocity at the input side and at the output side of each of the Hooke joints 51, 53, 55, and 57 will follow a sine wave shape according to the rotational phase (rotational angle) of the yoke element of said Hooke joint. As a result, the rotational fluctuation ratio on the input side and on the output side in a three part propeller shaft assembly of the construction generally described above will vary accoding to the phase combinations for these first through fourth Hooke joints 51, 53, 55, and 57. Accordingly, the present inventive entity conducted an investigation into the matter of wobbling of the center propeller shaft portion front and rear bearing supports in six different three part propeller shaft assemblies of the construction generally described above, utilizing different phase combinations for the first, the second, the third, and the fourth Hooke joints 51, 53, 55, and 57, one of said three part propeller shaft assemblies being according to the present invention, one being a prior art type of three part propeller shaft assembly, and four being heterogenous, in order to provide an analysis based upon the kinematic principles of Hooke joints. The phases of the various joints in each case were as shown in the following table:

| Prop. shaft | J51 | J53 | J55 | J57 |
|---|---|---|---|---|
| Prior Art Example | 0° | 90° | 0° | 90° |
| Comparison Example 1 | 0° | 0° | 90° | 90° |
| Comparison Example 2 | 0° | 0° | 0° | 0° |
| Comparison Example 3 | 90° | 0° | 0° | 0° |
| Comparison Example 4 | 0° | 90° | 0° | 0° |
| The Present Invention | 0° | 90° | 90° | 0° |

In this table, the phases of the first Hooke joint 51, of the second Hooke joint 53, of the third Hooke joint 55, and of the fourth Hooke joint 57, are shown, for each of the cases concerned. An analysis was performed under conditions of fixed input torque, with the joint angles of the first through the fourth joints at $-5°$, $+5°$, $+5°$, and $-5°$, respectively.

Figure 5:
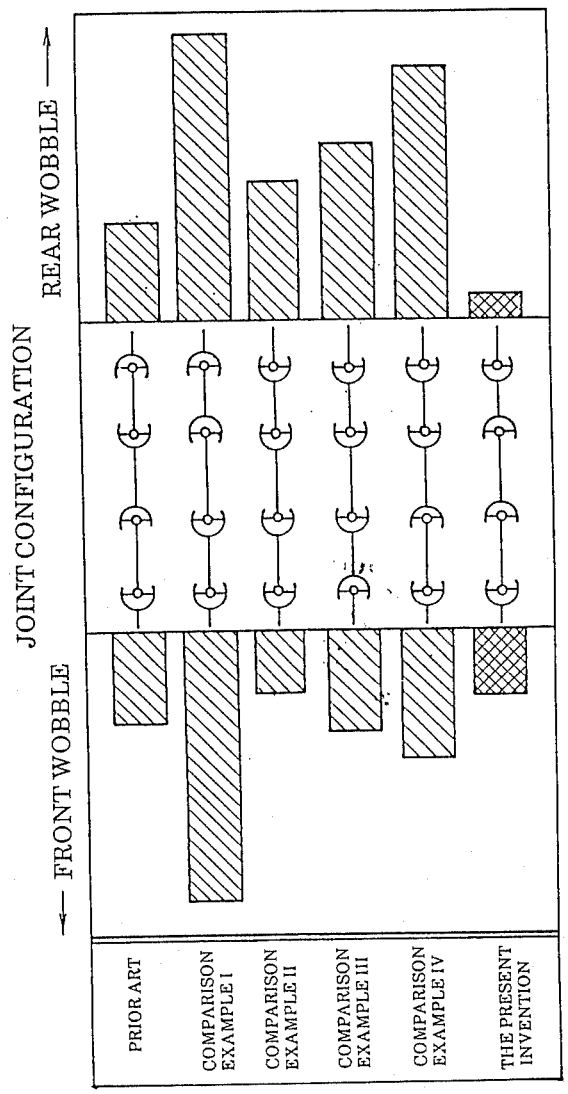
FIG. 5 is a two sided bar chart, showing the results of tests contrasting the effectiveness of said preferred embodiment of the three part propeller shaft assembly according to the present invention with the performance of various comparison three part propeller shaft assemblies which are not embodiments of the present invention.
Figure 6:
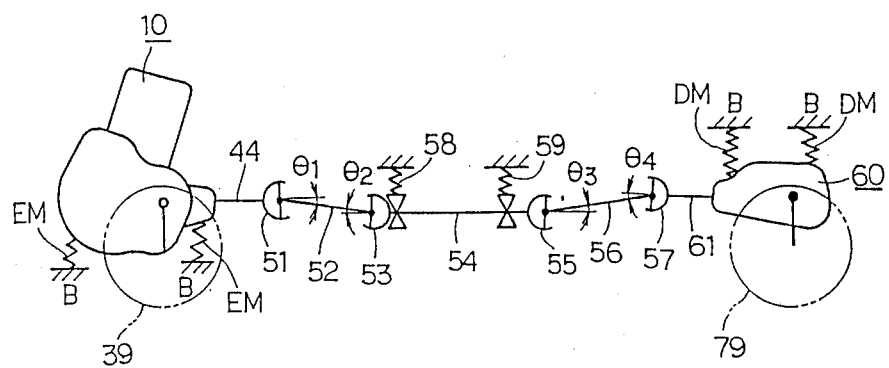
FIG. 6 is a schematic skeleton side view, similar to FIG. 1 for the first preferred embodiment, showing a prior art type three part propeller shaft assembly, also as fitted to the power train of an automotive vehicle.

The results are shown in the double bar chart of FIG. 5. For each case, the left side of the figure shows the wobbling amount of the center shaft front bearing support 58, while the right side of the figure shows the wobbling amount of the center shaft rear bearing support 59.

As will be clear upon consideration of these results, the three part propeller shaft assembly according to the present invention provides a great reduction in the amount of wobbling and vibration imposed upon the center shaft front bearing support 58 and upon the center shaft rear bearing support 59, in comparison to the prior art, and in comparison to the Comparison Examples 1 through 4.

Further, the present inventors conducted a set of comparison experimental tests between the three part propeller shaft assembly of the present invention and the five comparison examples described above, and thereby concretely confirmed the effectiveness of the present invention.

Thus, according to the shown structure for this three part propeller shaft, the secondary couples of forces which tend to wobble the center propeller shaft element are caused to partially cancel one another out and are dispersed, and thus the wobbling vibration and noise due to secondary force couples on the center propeller shaft element is minimized. Further, this is done without entailing any particular increase of manufacturing cost. Yet further, since the numbers of joints with the one phase and with the opposite phase are equal, there being in fact two of each, the rotational wobblings set up in the first through the fourth Hooke joints produce almost no disadvantageous effects. Thereby, wobbling of the center propeller shaft element is minimized, and it also becomes possible to set the spring constants of the two elastic center shaft bearing supports for said center propeller shaft element to be relatively low, which enables the reduction of noise such as booming noise in the passenger compartment and further increases the durability of said two elastic center shaft bearing supports for said center propeller shaft element.

Although the present invention has been shown and described in terms of the preferred embodiment thereof, and with reference to the appended drawings, it should not be considered as being particularly limited thereby. The details of any particular embodiment, or of the drawings, could be varied without, in many cases, departing from the ambit of the present invention. For example, the present invention could be applied to a vehicle of the four wheel drive type in which the engine was disposed in the rear of the vehicle, or to a vehicle with a longitudinally mounted engine. Accordingly, the scope of the present invention is to be considered as being delimited, not by any particular perhaps entirely fortuitous details of the disclosed preferred embodiments, or of the drawings, but solely by the legitimate and properly interpreted scope of the accompanying claim, which follows.

What is claimed is:

1. For a vehicle comprising a means for providing rotational power, a means for receiving rotational power and transmitting it to a road surface, and a body:
   a three part type propeller shaft assembly, comprising:
   a first propeller shaft element, a second propeller shaft element, and a third propeller shaft element, each shaft element having a first end and an opposite second end;
   a first joint comprising a Hooke joint which rotationally couples said means for providing rotational power to said first end of said first propeller shaft element;
   a second joint comprising a Hooke joint which rotationally couples said second end of said first propeller shaft element to said first end of said second propeller shaft element;
   a third joint comprising a Hooke joint which rotationaly couples said second end of said second propeller shaft element to said first end of said thrid propeller shaft element;
   a fourth joint comprising a Hooke joint which rotationally couples said second end of said third propeller shaft element to said means for receiving rotational power and transmitting it to a road surface; and
   two means for elastically rotatably supporting said second propeller shaft element from said body, one means being disposed near each end of the first and second ends of said second propeller shaft element; the phases of said first joint and said fourth joint being set to be the same as one another, while the phases of said second and said third joints are set to be the same as one another and to be opposite to said common phase of said first joint and said fourth joint.

* * * * *